(12) United States Patent
Pance et al.

(10) Patent No.: US 8,398,287 B2
(45) Date of Patent: Mar. 19, 2013

(54) MULTICOLOR LIGHTING SYSTEM

(75) Inventors: Aleksandar Pance, Saratoga, CA (US);
Duncan Kerr, San Francisco, CA (US);
Brett Bilbrey, Sunnyvale, CA (US);
Michael F. Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/424,085

(22) Filed: Mar. 19, 2012

(65) Prior Publication Data

US 2012/0176773 A1 Jul. 12, 2012

Related U.S. Application Data

(63) Continuation of application No. 12/495,230, filed on Jun. 30, 2009, now Pat. No. 8,138,687.

(51) Int. Cl.
*F21V 7/04* (2006.01)

(52) U.S. Cl. .......................... 362/606; 362/610; 362/615

(58) Field of Classification Search ............... 315/169.4, 315/184, 291, 294, 312, 324; 362/601, 606, 362/610–613, 615; 345/83, 102, 690
See application file for complete search history.

(56) References Cited

U.S. PATENT DOCUMENTS

| 7,008,090 | B2 | 3/2006 | Blank |
| 7,109,465 | B2 | 9/2006 | Kok et al. |
| 7,236,154 | B1 | 6/2007 | Kerr et al. |
| 7,322,731 | B2 | 1/2008 | Epstein et al. |
| 7,364,306 | B2 | 4/2008 | Margulis |
| 7,455,423 | B2 | 11/2008 | Takenaka |
| 7,501,960 | B2 | 3/2009 | Price et al. |
| 7,656,371 | B2 | 2/2010 | Shimizu et al. |
| 7,679,828 | B2 * | 3/2010 | Munro ........................... 359/627 |
| 7,736,047 | B2 | 6/2010 | Ohashi et al. |
| 7,750,282 | B2 | 7/2010 | Mahowald et al. |
| 7,769,353 | B2 | 8/2010 | Dietrich et al. |
| 7,872,430 | B2 | 1/2011 | Roberts et al. |
| 7,888,883 | B2 | 2/2011 | Crawford et al. |
| 8,138,687 | B2 | 3/2012 | Pance et al. |
| 2007/0019394 | A1 | 1/2007 | Park et al. |
| 2007/0120496 | A1 * | 5/2007 | Shimizu et al. ............ 315/169.3 |
| 2008/0094004 | A1 | 4/2008 | Ackermann |
| 2008/0170039 | A1 * | 7/2008 | Shin et al. ...................... 345/170 |
| 2008/0247722 | A1 * | 10/2008 | Van Gorkom et al. ......... 385/129 |
| 2009/0067156 | A1 * | 3/2009 | Bonnett et al. ............... 362/97.2 |
| 2009/0092366 | A1 * | 4/2009 | Iwasaki ......................... 385/129 |
| 2009/0128735 | A1 * | 5/2009 | Larson et al. .................. 349/62 |
| 2009/0154419 | A1 * | 6/2009 | Yoshida et al. ............... 370/330 |
| 2010/0328936 | A1 | 12/2010 | Pance et al. |

FOREIGN PATENT DOCUMENTS

| CN | 201185147 | 1/2009 |
| KR | 100870113 | 11/2008 |
| WO | WO2007/071397 | 6/2007 |
| WO | WO2008/038915 | 4/2008 |

* cited by examiner

*Primary Examiner* — Tung X Le
(74) *Attorney, Agent, or Firm* — Park, Vaughan, Fleming & Dowler LLP

(57) ABSTRACT

A multicolor light source including a first light source operably to emit a first light of a first color and a second light source operably to emit a second light of a second color. The multicolor light source also includes a first wave guide optically connected to the first light source and a second wave guide optically coupled to the second light source and to the first wave guide. The combination of the first wave guide and the second wave guide couples the first light to the second light to create an outputted light having at least one aspect, other than hue, different from the first light and the second light.

20 Claims, 5 Drawing Sheets

MULTICOLOR LIGHTING SYSTEM

CROSS-REFERENCE TO RELATED APPLICATIONS

This application is a continuation patent application of U.S. patent application Ser. No. 12/495,230, filed Jun. 30, 2009 and titled "Multicolor Lighting System;" which is related to U.S. patent application Ser. No. 12/495,353, filed Jun. 30, 2009 and titled "Multicolor Light Emitting Diodes;" the disclosures of which are hereby incorporated herein in their entireties.

BACKGROUND

1. Technical Field

The present invention generally relates to light sources and, more specifically, to multicolor light-emitting diodes.

2. Background Discussion

Many electronic components, devices and/or systems utilize light sources. The light sources may be used for various purposes such as providing light for room lighting, better visibility, decoration, indicators, imaging and so on. Depending on the use, the light source may vary and may be any of fluorescent, halogen, incandescent, mercury vapor, high pressure and low pressure sodium lights, as well as light emitting diodes ("LEDs"), organic light emitting diodes ("OLEDs") and so on.

Light sources may often be used interchangeably; some light sources have similar operating requirements such as power, space and so on. Although various light sources may be used for the same application, one light source may be more appropriate in a given application than another. For example, although a halogen light may adequately light a house, a fluorescent light may be better in certain respects due to thermal energy constraints and lifetime performance requirements.

In some circumstances, a system may be designed to use a particular type of light source, but improvements for the chosen light source such as power efficiency and/or increased light intensity may be desirable. For example, although LEDs may produce relatively efficient light when compared to fluorescent or incandescent lights, they are also often less intense. Typically, LEDs require less power to create the same intensity as another light source and thus may be more power efficient. Because their power efficiency, LEDs are frequently used in a variety of lighting systems, from computing devices to traffic lights. Oftentimes, LEDs are used in computing devices as indicators, backlights, status lights and so on. In many LED applications, high intensity output may be useful to increase or enhance viewing. This may be true not only of the aforementioned uses, but also in LED-lighted televisions, flashlights, and many other devices.

SUMMARY

Embodiments disclosed herein may combine light outputted from multiple light sources to create a combined light, also referred to as an "outputted light." The combined light may have different physical or perceptual properties from the constituent lights outputted by the light sources. For example, the combined light may have a different tint or brightness than either constituent light. Additionally, the combined light may share certain properties with at least one of the constituent lights, such as color.

Generally, one embodiment of the present invention may take the form of a multicolor light source. The multicolor light source may include a first light source operable to emit a first light of a first color; a second light source operable to emit a second light of a second color; and a wave guide coupling the first light to the second light, thereby creating an outputted light having at least one aspect, other than hue, different from the first light and second light.

Another embodiment may take the form of a method for outputting a light, including the operations of: activating a first light source to output a first light having a first color; determining that at least one aspect of the first light does not match a desired profile; and activating a second light source to output a white light in conjunction with the first light source; wherein the light and the white light combine to produce an outputted light.

Yet another embodiment of the present invention may take the form of a method for providing multiple colors in a display system. In this embodiment, a first light emitting diode may be operable to emit white light, a second organic light emitting diode operable to emit red light, a third organic light emitting diode may be operable to emit green light and a fourth organic light emitting diode may be operable to emit blue light, wherein the first light emitting diode, and second, third and fourth light organic light emitting diodes may be configured to emit white, red, green and blue light in combination with one another. The first light emitting diode may be a white organic light emitting diode, and the first, second, third and fourth organic light emitting diodes may be included within a pixel.

Continuing the description of this embodiment, the first light emitting diode and the second, third and fourth organic light emitting diodes may be arranged in a stack configuration. Alternatively, the second, third and fourth organic light emitting diodes may be arranged in a grid pattern and the first light emitting diode may be arranged in a stack configuration with respect to the second, third and fourth organic light emitting diodes, such that the first light emitting diode may be located beneath the second, third and fourth organic light emitting diodes.

DETAILED DESCRIPTION OF EMBODIMENTS

Figure 1A:
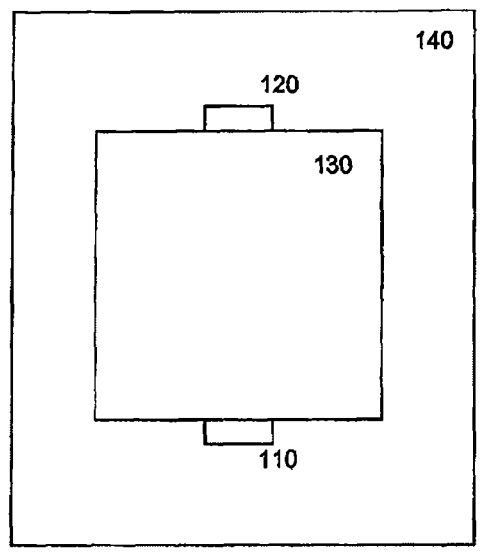
FIG. 1A is a top-down view of a sample lighting system.

Generally, one embodiment of the present invention may take the form of a system capable of emitting various light colors individually or in combination. In this embodiment, the system may include one or more colored light sources as well as a white light source. The white light source, when operating in conjunction with the other light sources, may increase the overall intensity of light emitted by the embodiment. For example, the system may have three different light emitters capable of projecting red, green and blue light, respectively. As can be appreciated, when all three light emitters are active the embodiment would emit a white light. However, an additional white light source may form part of the embodiment and be used interchangeably with the three colored light sources to produce a white light, or may be used in addition to the three colored light sources to produce a higher intensity white light with increased power efficiency. As will be discussed further below, the white light source may also increase the intensity of light emitted from any of the other light emitter and/or change the color of such light.

Another embodiment takes the form of a method for providing lighting in an electronic device, such as a computing device, mobile telephone, television, traffic light and so on. A lighting package may include a multicolor light source and a white light source. In addition to emitting white light by itself, the white light source may operate in conjunction with the multicolor light source and increase the overall brightness of the light emitted by the multicolor light source. For example, the multicolor light source may emit red light and the white light source may simultaneously emit white light, thereby increasing the perceived brightness of the red light. Using the white light source to increase the brightness of lighting provided by the system may also increase the lifetime performance of the multicolor light sources, insofar as the multicolor light sources, when operating in conjunction with the white light source may require less power than necessary to achieve the equivalent brightness of light. Likewise, the embodiment may also increase the power efficiency of an associated lighting system in its entirety when compared to the lighting system without the white light.

It should be noted that embodiments of the present invention may be used in a variety of computing, image processing and/or lighting systems. The embodiment may include or work with a variety of display components, monitors, screens, images, sensors, keyboards, indicators, computing elements (including input/output devices) and other electrical devices. Aspects of the present invention may be used with practically any apparatus related to optical and electrical devices, display systems, presentation systems or any apparatus that may contain any type of display and/or lighting system. Accordingly, embodiments of the present invention may be employed in computing systems and devices used in visual presentations and peripherals and so on.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

FIG. 1A depicts one embodiment of a lighting system 100 that may provide various light colors in varying intensities. The lighting system, which takes the form of one or more LEDs 110, 120 and associated light guides 130, 135, is referred to herein as an "LED package." Such a package may include a housing at least partially enclosing the LED(s) and, in some embodiments, at least a portion of the light guide(s). The LED package 100 may include a multicolor LED 110 capable of producing a variety of colors and a white LED 120 capable of emitting white light. LED package 100 may be configured to provide light colors such as red, green, blue and white light and any combination thereof. One such combination may be, for example, combining the light colors blue and green to emit a yellow light color from the lighting system 100. In another example, the light colors red and blue may be combined to emit a magenta light color and a white light may be additionally combined with the light colors red and blue to provide a brighter light output from the lighting system 100 while approximately maintaining the magenta light color. The addition of white light to the light colors red and blue may dilute or soften the magenta light color emitted from the red and blue light sources, but may provide a brighter light with increased power efficiency for the lighting system 100. It should be appreciated that multiple single color LEDs may be used in place of the multicolor LED 110. For example, an alternative embodiment may include a red LED, blue LED and green LED in place of the multicolor LED.

As shown in FIG. 1A, some of the light sources of system 100 may be LEDs, though any appropriate light source may be used. In another embodiment of FIG. 1, the lighting system 100 may include a multicolor LED 110 (or individual red LEDs, green LEDs, and blue LEDs instead) and a white light source 120. The white light source 120 may be a white LED, as shown in FIG. 1, or a different lighting element, such as an organic LED (OLED), cold cathode fluorescent lamp, incandescent light, fluorescent light and so forth. Accordingly, it should be understood that references herein to an LED or LEDs are intended to be exemplary and embrace other light emitting elements, including (but not limited to) the aforementioned. Likewise, alternative embodiments may employ a single multicolor light source in place of any or all of the red, green and blue light sources.

The lighting system 100 may also include a light guide 130 to direct light emitted from the LEDs 110, 120 to a defined light path or to a specific area. The light guide 130 will be discussed in further detail below.

The lighting system 100 of FIG. 1A depicts the multicolor LED 110 and white LED 120 separate elements that may be affixed to a common board and/or base 116 and/or contained within a single housing. In alternative embodiments, the LEDs may be affixed to separate printed circuit boards (or not to a circuit board at all), contained within separate housings, and so on. The LEDs may be configured in any arrangement. For example, in an embodiment employing individual LEDs instead of a multicolor LED, the red, green, blue and white LEDs may be placed side by side, at the four corners of a square, in a triangle with a fourth LED in the middle, with the red, green and blue LEDs on one side of the embodiment 100 and the white LED on another, and so on. Accordingly, it should be understood that the arrangement shown in FIGS. 1A and 1B is but one possible configuration; others may be employed in alternative embodiments.

Figure 1B:
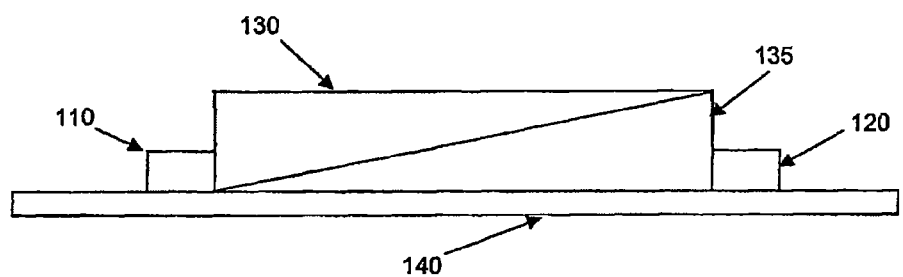
FIG. 1B is a side view of the sample lighting system of FIG. 1A.

As also shown in FIGS. 1A and 1B, one embodiment 100 may include a first light guide 130 and a second light guide 135. The first light guide 130 is coupled to the side-firing red, green and blue LEDs 110, 112, 114 while the second light guide 135 is optically coupled to the side-firing white LED 120. Each light guide 130, 135 redirects light emitted by the associated LEDs 110, 112, 114, 120. In the embodiment of FIGS. 1A and 1B, the light guides perpendicularly redirect emitted light, such that the light entering the sides of the light guides (e.g., the lights emitted by the side-firing LEDs) exits the top surface of the guides. In this manner, side-firing LEDs may be placed adjacent to the light guides and nonetheless be used to illuminate objects, windows, keys, buttons, status indicators and other items above the light guides.

As shown in both the top-down view of FIG. 1A and the side view of FIG. 1B, the first and second light guides 130, 135 are both ramp-shaped. Further, in the sample embodiment 100, each light guide 130, 130 is half of a rectangular prism. The light guides are placed with their sloped sides adjacent to form the rectangular prism. Accordingly, light from the white LED 130 (shown on the right-hand side of FIG. 1B) may pass through both light guides before emanating from the top of the embodiment 100 and ultimately illuminating a target device or area. Thus, the light guides 130, 135 are structured such that the combination of the two disperses light into a desired, final pattern as the light emanates from the top. In other words, the topology of each light guide and its refractive or redirecting properties may be based in part on such properties of the other light guide as well as the configuration of the two guides with respect to one another.

Figure 3:
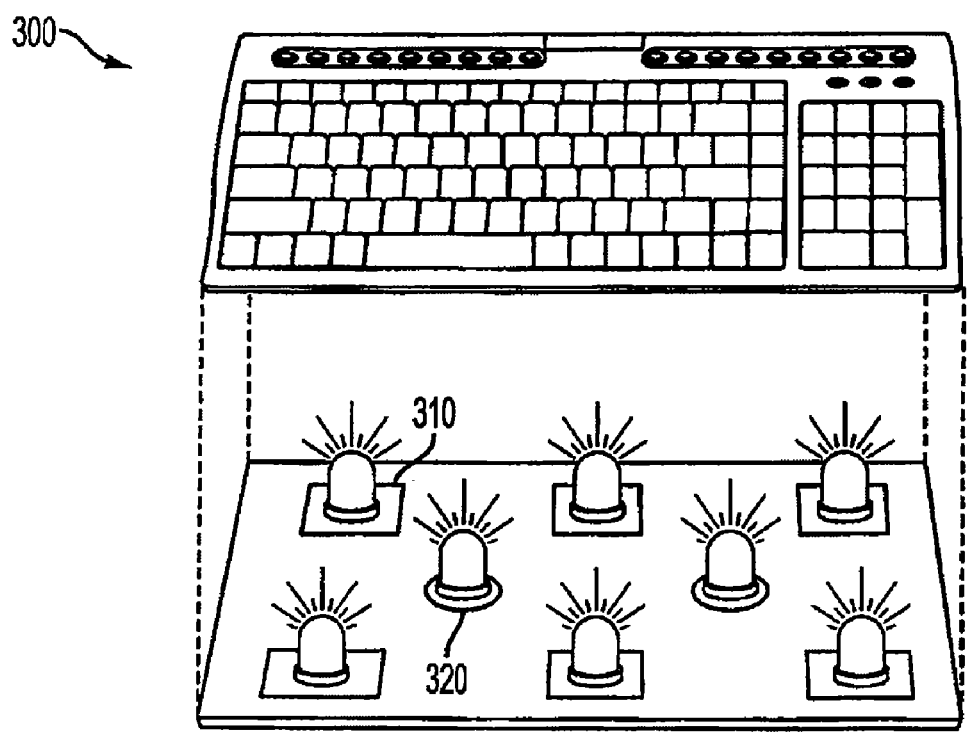
FIG. 3 depicts a second embodiment of a backlit keyboard.

Further, the light guides 130 may couple light emitted from adjacent light sources as shown in FIG. 1 or may couple light emitted from light sources that are farther apart as shown in FIG. 3. Generally, the light guide may scatter or focus the emitted light as appropriate. For example, to increase uniformity of color, the light guide may scatter the different colors of light which may give the perception of a more uniformly mixed color. In another example, the light guide may focus the emitted light so that the individual colors emitted by the multiple light sources may be perceived as individual colors.

Multiple LEDs may be active simultaneously to provide a variety of effects. As one example, two LEDs emitting different color lights may activate simultaneously, thereby producing a third color that neither LED could emit alone. As an example of this, the green and blue LEDs may emit light at the same time. Since the LEDs are very close to one another and their outputs are spread across the same area by the light guide 130, the human eye perceives this dual output as a single, yellow colored light.

As another example, two LEDs may emit light simultaneously to create a "combined light" having the same color (e.g., red, green, purple, and so forth) as light emitted by one of the active LEDs (the "base color light") but a greater brightness. Further, although the combined light may be perceived by an observer as having the same color as the light emitted by one of the LEDs alone, the tint of the combined light may vary from that of the base color light. Continuing the example, if the red LED and white LED are simultaneously activated, the outputted light may appear to be a pastel red having a first brightness. By contrast, when the red LED emits light by itself, the outputted light may appear to be a darker red having a second brightness that is less than the first brightness. Thus, activating the white LED may enhance the brightness of an outputted or combined light but at the cost of changing the outputted light to a lighter tinted shade. Generally, the combination of white light produced by the white LED 120 and colored light produced by the multicolor LED 110 outputs a combined light having a tint that may be unattainable by the multicolor LED alone.

It should be appreciated that the tint of a light is different than the color of a light. "Color," as used herein, generally refers to the hue of a visible light while "tint" refers to the lightness of the hue. Thus, a red LED may output red light having a specific color and tint. The same red LED's output, when combined with the white light output of a white LED, generally results in an outputted light having the same hue but a different tint (e.g., approximately the same dominant wavelength but different lightness).

In summary, the illumination from two or more light color sources, when added together, may produce a light having an increased illumination when compared to the light emitted by either one of the two sources individually. Likewise, such combinations may result in tints or shades of emitted colored light that may not be achieved without a white light source.

In an embodiment having multiple color-emitting LEDs, the lighting system 100 may also produce various colors by combining different intensities of light generated by the LEDs. Generally, a light source such as an LED may emit a color at different intensities. Although an LED may emit a specific color of light, the LED may vary the brightness of the emitted light by changing the duty cycle of the LED's input. Each individual light source of embodiment 100 may achieve a range of illumination intensities for its specific color. For example, a red LED typically emits a red light (e.g., light generally having a wavelength from 610 nm to 760 nm) having a fixed frequency or wavelength, although the brightness of the emitted light may be changed by varying the input duty cycle. Producing varying levels of brightness for an LED will be discussed in further detail below.

Additionally, the lighting system 100 may emit white light by using the combination of the red LED 110, green LED 112 and blue LED 114 simultaneously, and/or by emitting white light from the white light source 120. The intensity and/or brightness of the emitted white light from the lighting system 100 may be increased by combining the white light emitted by the combination of the three LEDs, red LED 112, green LED 114, blue LED 116, and the white light emitted by the white light source 120. The white light source 120 may be referred to herein as the white LED 120 for explanatory purposes only. The white LED 130 may be used in combination with the remaining three LEDs of FIG. 1 in order to increase the intensity of the white light produced by the three LEDs, or may be used to increase the power efficiency of lighting system 100. For example, the power efficiency of the white LED 120 at a defined intensity may be better than the power efficiency of using the three LEDs in combination to produce white light at the same defined intensity. Generally, power efficiency of an LED, as discussed herein, may refer to the light output as measured in terms of power input. Because the white LED 120 may more efficiently produce white light than the combination of the three LEDs, the lighting system 100 may use only the white LED 120 to emit white light, rather than employing the multicolor LED 110 (or multiple LEDs in other embodiments).

Figure 2:
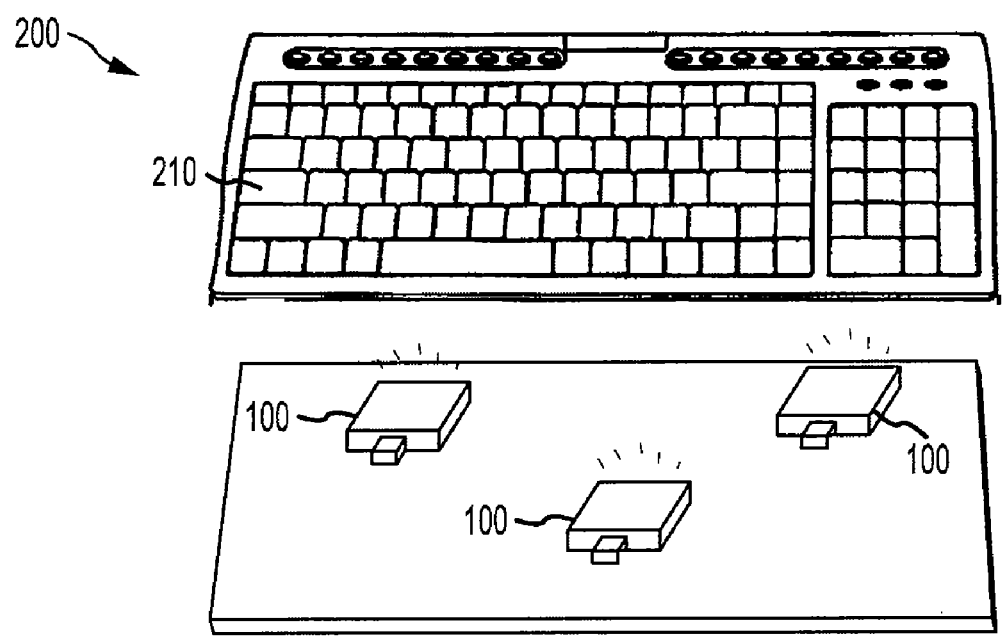
FIG. 2 depicts a first embodiment of a backlit keyboard.

Turning now to FIG. 2, system 200 includes a keyboard 210 that may use multiple LED packages 100 to illuminate the keys of the keyboard 210. This process is referred to as "backlighting" since the keys are lit from behind, or the back of the keys. Although FIG. 2 shows only three LED packages 100 providing backlighting, it should be understood that embodiments may employ more or fewer LEDs and/or LED packages. For example, a single set of LEDs may be used to illuminate the entire keyboard or one set of LEDs may be used to illuminate each key separately. Further, the number of LEDs in each package may vary. Certain embodiments may use a single multicolor or white LED for each package while others may employ multiple LEDs. As one example, the embodiment 200 shown in FIG. 2 uses two LEDs in each housing 100, specifically a multicolor LED 110 and a white LED 120. It should be appreciated that the exact configuration of the light guide(s) will vary depending on the area illuminated by the corresponding LED package.

As previously discussed with respect to FIG. 1, each lighting system 100 may include a multicolor light source and a white light source. Additionally, the light sources of the lighting system 100 may be an LED, an OLED or any other light source capable of providing desired colors of light. In one example, the white light source may be a white LED and may be packaged together with red, green and blue LEDs. A sample multicolor LED is discussed in Ser. No. 12/495,353, titled "MULTICOLOR LIGHT EMITTING DIODE", which is incorporated herein in its entirety by reference.

In another example and as shown in FIG. 3, the backlit keyboard 300 may include one or more white light sources situated separately from the LED packages 310. In such an embodiment, the LED packages 310 generally lack any white light source, in contrast to the embodiments discussed with respect to FIGS. 1A, 1B and 2. Instead, in FIG. 3, the white light sources 320 may be spaced to provide uniform illumination. The white light sources 320 may nonetheless be activated in tandem with the LED(s) in the packages 320, thereby potentially increasing the brightness of light emitted from the packages. The exact number and spacing of the white light sources 320, when divorced from the LED packages 310, may vary between embodiments. As one example, there may be one white light source 320 for every three multicolor LED systems 310 as shown in FIG. 3 such that each white light source supports and operates with three associated multicolor LED systems.

The number of white light sources used in the lighting system 100 or any computing element 200, 300 may depend on the desired light mixing, light intensity and uniformity of color across the system. For example, as the desired light intensity is increased, the number of white light sources may also increase. In another example, it may be desirable to have the ability to combine a white light with each individual color of the multicolor LEDs. Continuing this example, a white LED may be included with each set of multicolor LEDs as shown in FIG. 1, or may be packaged together with the multicolor LEDs, as discussed in Ser. No. 12/495,353, titled "MULTICOLOR LIGHT EMITTING DIODE", which is incorporated herein in its entirety by reference. By combining a white LED with each set of multicolor LEDs the overall brightness of a lighting system may be increased.

In another embodiment, the white light source may be used to increase the intensity and range of colors in a system or electronic device employing an OLED. OLEDs may be used in a number of devices, including displays, lights, indicators, decorations, mobile devices, personal digital assistants and so on. Generally, an OLED is an LED having an emissive electroluminescent layer made from an organic compound, typically a film. The organic compound film may be deposited in rows and columns and a resulting matrix of pixels may result. The pixels may emit different color light. OLEDs are also known as light emitting polymers or organic electroluminescent devices.

Figure 4:
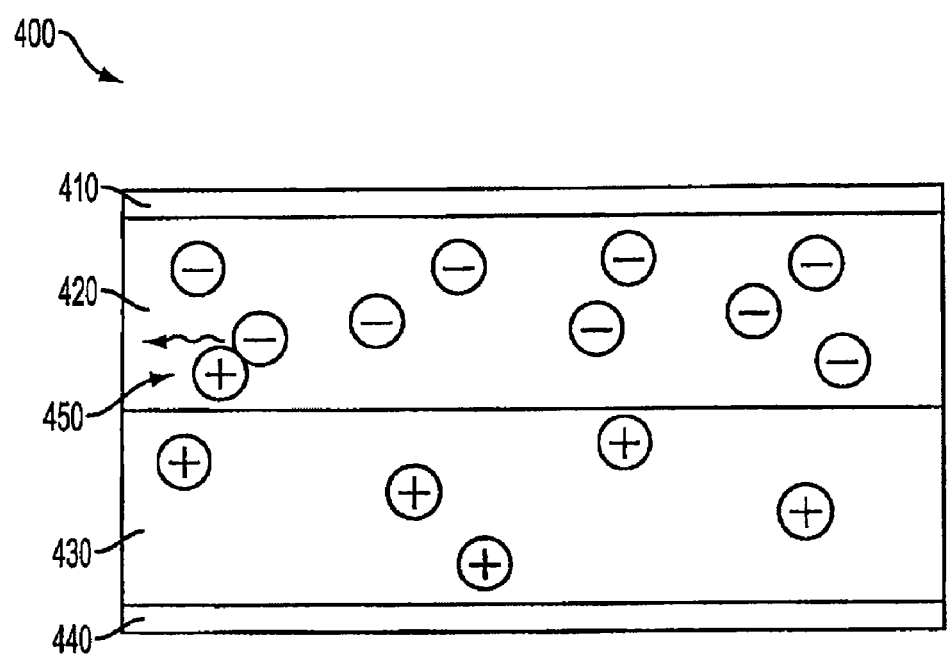
FIG. 4 depicts a general representation of an OLED.

FIG. 4 depicts one example of a general OLED 400. The OLED 400 may be a flexible sheet that emits light and may include a cathode layer or cathode terminal 410, an anode layer or anode terminal 440, an emissive layer 420 and a conductive layer 430. As shown in FIG. 4, the emissive layer 420 is adjacent to the anode layer 410 and accepts electrons driven to the emissive layer from the anode layer. The conductive layer 430 is adjacent to the cathode layer 440 and includes holes driven thereto from the cathode layer 440.

A voltage may be applied across the OLED 400 so that electrons may flow from the cathode to the anode. The applied voltage may cause electrons from the cathode layer 410 to move to the emissive layer 420 and may also cause holes from the anode layer 440 to move to the conductive layer 440. The electrons of the emissive layer and the holes of the conductive layer may be attracted to one another due, in part, to electrostatic forces and may recombine. In some OLEDs, the hole mobility may be higher than the electron mobility, thus causing the recombination to take place in the emissive layer 420. Once the electron and hole recombine, the electron may drop to a lower energy level and thereby emit radiation in the visible spectrum.

When an OLED film is used in a display device, the resulting device may be thinner than a liquid crystal display (LCD), such as those incorporating LEDs and/or CCFLs as backlighting sources. OLEDs generally require less power to function than LCDs in part since no backlight is necessary. However, the lifetime of OLED displays may be shorter than the lifetime of LCD displays. In displays employing multiple OLEDs each outputting single colors, the blue OLEDs may have a shorter lifetime than the other OLED colors. Given blue, red and green light of the same absolute brightness, the red and green lights will appear brighter than the blue light to the human eye. Thus, across a period of time an OLED display may generally require the blue OLED operate to output a greater brightness than the red or green LEDs. Since the brightness of light outputted by an OLED varies directly with the duty cycle of the OLED, during prolonged typical operation the blue OLED may be active longer than either a red OLED or green OLED and thus burn out more quickly.

In one application, OLEDs may be used as the emissive layer of a display panel. The OLED panel may display multiple colors of light by employing a red OLED, a green OLED and a blue OLED. Continuing this embodiment, the OLED panel may be backlit with a white light source to increase the light intensity of the lighting panel without increasing the duty cycle of the OLEDs. For example, the lighting panel may display the color blue and the white light source may be used behind the lighting panel to increase the light intensity without increasing the power provided to the blue OLED itself, and thus without increasing the operating time of the OLED. Accordingly, the use of the white backlight may prolong the life of the display panel, as well as its constituent OLEDs, as well as reduce its power consumption.

Additionally, as previously discussed, although the red, green and blue OLEDs may be used to produce white light, it may be more power efficient to use the white light source instead of or in addition to the red, green and blue OLEDs to produce white light. The OLEDs may be arranged in a stacked configuration in the display, may be arranged adjacent to on another and so on. As one example, the stacked configuration may be a pixel architecture that locates the red OLED, green OLED, blue OLED and white OLED on top of one another. This pixel architecture may increase the color gamut of the OLED display because the pixel gap may be reduced. Generally, the color gamut may be a range of colors capable of being displayed on the screen and/or display.

Because the backlighting source emits white light, the colors displayed by the OLED may not substantially change although their tint may. That is, the emitted light may be perceived as softer, more pastel versions of the colors that would be emitted without a white backlight. In this example, the lighting panel may still display the color blue, but the blue color may be tinted due to the addition of the white light source. The white light source used in such a display panel may be a halogen light, incandescent light, CCFL, LED, OLED and so on.

In another example, the individual OLEDs may be configured in a two by two grid, may be arranged in a horizontal linear pattern, a vertical linear pattern or any grid or pattern including randomly. The configuration of the OLEDs may depend on the intended use of the OLED, the size of the OLED, the uniformity of the light color emitted from the OLED and so on. For example, the white OLED may be centrally located and the red, green and blue OLEDs may be arranged around the white OLED to increase the color uniformity and intensity uniformity of the emitted light from the multicolor OLED. In another example, the red, green and blue OLEDs may be located adjacent to and side by side with one another (not stacked on top of each other) and the white OLED may be located beneath the red, green, and blue OLEDs so that the white OLED is in a stacked configuration with respect to the red, green and blue OLEDs.

Figure 5:
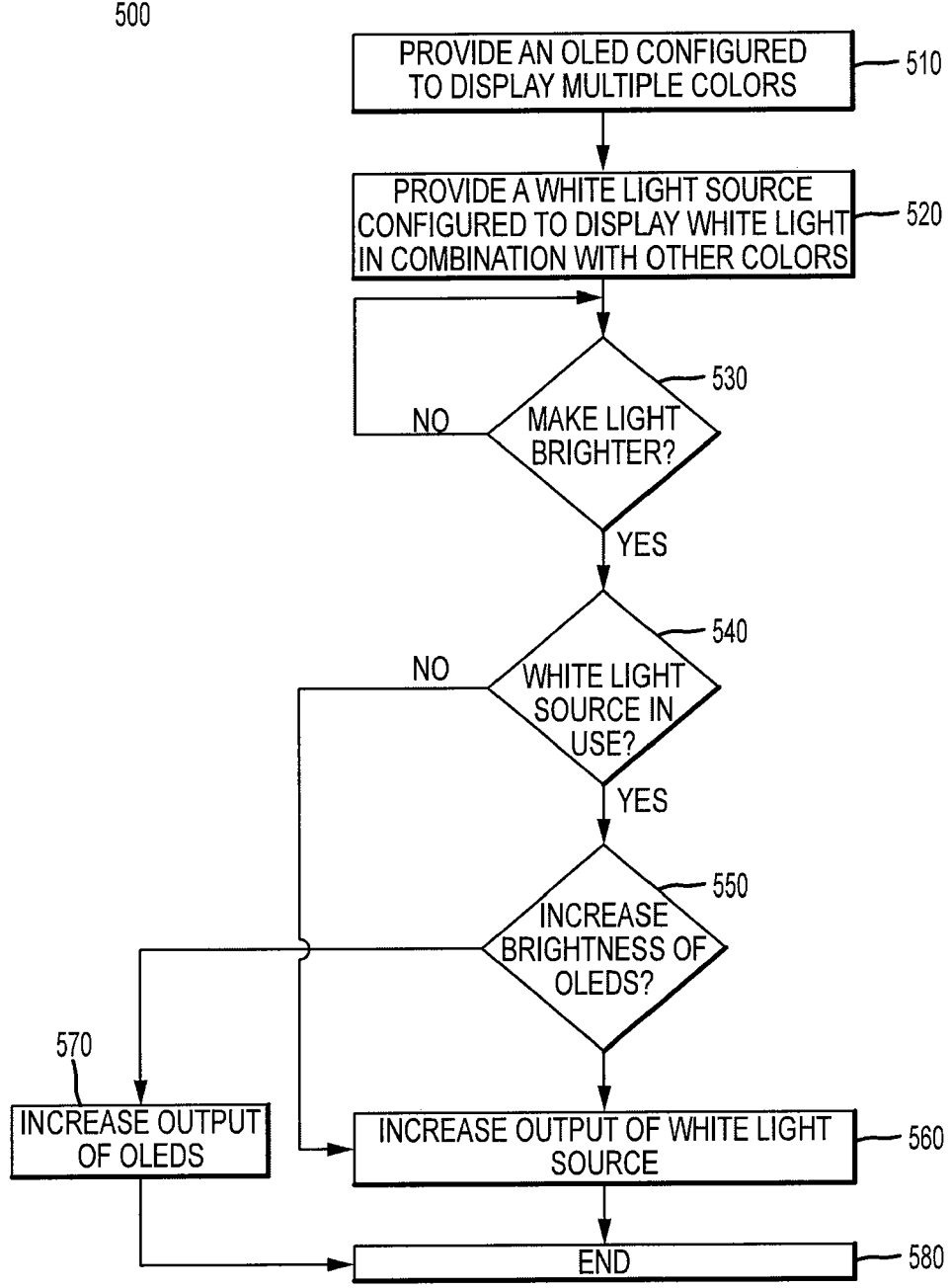
FIG. 5 is a flowchart showing a method for emitting various shades of light by combining the outputs of a first and second light source.

FIG. 5 is a flowchart generally describing one method 500 for combining colors of light. Although FIG. 5 generally describes the operation of OLEDs, it should be appreciated that this method is equally applicable to the operation of LEDs or any other light source, as well as combinations of different types of light sources.

In operation 510, the OLEDs may be configured to display multiple colors of light. For example, the OLEDs may be arranged into one or more pixels for displaying an image. Each pixel may display a color emitted by at least a red OLED, a green OLED and a blue OLED. The three OLEDs may display various colors by emitting light individually or in any combination. Additionally, the emitted light may vary in color depending on the intensity of each of the individual emitted colors of light. For example, the red OLED may be emitting a high intensity red color and the blue OLED may be emitting a low intensity blue color. The resulting color may be a magenta color of light, but the magenta may appear towards the color pink. In another example, the blue OLED may be emitting a high intensity blue color and the red OLED may be emitting a low intensity red color of light, thus the resulting color of light may be a deeper bluish magenta color of light. The red, green and blue OLEDs may also be combined to emit white light.

In operation 520, white light may be produced by a white light source. The white light source may be a white LED or a white OLED and may also be included in one or more pixels for displaying an image. The white light source may provide white light more efficiently then by combining the red, green and blue colors to produce white light. The white light source may also provide the appearance of a brighter color of light when used in combination with a light color. For example, the green OLED may emit a green light, but instead of providing more power to the green OLED to produce a brighter green light, the white light may be used in combination with the green light. The combination of the green and white light may still appear substantially green, but with a softer green color. By using the white light source together with the multicolor OLEDs, the lifetime of the OLEDs may be increased because the color OLEDs may be used at a lower power, thus increasing the lifetime of the OLED.

In operation 530, a determination may be made whether the light needs to be made brighter. This determination may depend on sensors that adjust lighting based on ambient light conditions, a user request, an automatic monitor adjustment that adjusts the color displayed on the monitor as the monitor warms up to operating temperature and so on. If so, the embodiment proceeds to operation 540. If not, however, the method continues to poll the associated computing or device system to await a command to increase brightness of the light output.

Once it is determined that the light intensity is to be increased, next, in operation 540, it may be determined whether the white light source is emitting white light (e.g., whether it is in use). If the white light source is not providing white light, then operation 560 is accessed and the white light source powered on, thereby increasing the brightness of the combined light.

If the embodiment determines that the white light source is active in operation 540 then operation 550 is executed. In operation 550, the embodiment may determine if the brightness of the light provided by the non-white emitting OLEDs should be increased. If so, then operation 570 is executed and the brightness of the color-emitting OLEDs increases to provide the desired output brightness.

It should be noted that the determination of operation 550 may take into account a variety of factors. For example, it may be desirable to avoid increasing the brightness of the color-emitting OLEDs even if those elements are not operating at a maximum duty cycle. Certain embodiments may operate to increase a perceived brightness of an outputted light but minimize power drawn by the OLEDs. In such an embodiment, it may be more power efficient to activate or increase the duty cycle of the white OLED rather than increase the duty cycles of multiple color-emitting OLEDs. The embodiment may also take into account the service life of the various OLEDs when making this determination. As the color-emitting OLEDs age, the embodiment may reduce the activation time of these OLEDs to increase their remaining lifespan. Accordingly, the embodiment may power the white OLED to provide additional brightness and thereby determine not to increase brightness of the color-emitting OLEDs in operation 550. As yet another example, it may be determined in operation 550 that the red, green and blue OLEDs are already operating at a maximum duty cycle and thus their brightness cannot be increased.

If the embodiment determines that the brightness of the color-emitting OLEDs should not be increased in operation 550, it proceeds to operation 560 and increases the brightness of the white light source. Generally, brightness of any LED or OLED light source is increased by increasing the duty cycle of the light source. The white light source may increase the brightness of the outputted light and may be more power efficient than increasing the light by increasing the intensity of the color-emitting OLEDs. In operation 560, it may be determined that all of OLEDs and the white light source are at a maximum intensity and the method 500 will proceed to end state 580.

The previous examples discuss using OLEDs in displays and to produce images. OLEDs may also be used in other systems such as to backlight a keyboard. For example, a backlit keyboard may include a set of four OLEDs, a red OLED, a green OLED, a blue OLED and a white OLED. The OLEDs may provide different colors of light per key. It may be desirable for the backlighting to be brighter, thus the white OLED may be used to make the light color appear brighter and may also provide white light more efficiently then by producing white light by combining the red, green and blue colors of light. In one example, the white OLED may be positioned beneath the red, green and blue OLEDs in a stacked configuration.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

What is claimed is:
1. A multicolor light source, comprising:
a first light source operable to emit a first light of a first color;
a second light source operable to emit a second light of a second color;
a first wave guide optically connected to the first light source; and
a second wave guide optically connected to the second light source and the first wave guide, wherein
the combination of the first wave guide and the second wave guide operably couple the first light to the second light, thereby creating an outputted light having at least one aspect, other than hue, different from the first light and second light, wherein the operably coupling comprises one of:

scattering the first light and the second light in a predetermined pattern to increase a visually-perceived uniformity of a combined color of the outputted light; or focusing the first light and the second light in a predetermined pattern to increase a visually-perceived separation of colors of the outputted light.

2. The multicolor light source of claim 1, wherein:
the second light source is a white light emitting diode; and
the first light source is a multicolor light emitting diode.

3. The multicolor light source of claim 1, wherein the first light source is an organic light emitting diode.

4. The multicolor light source of claim 1, wherein the first light source comprises:
a first LED operable to emit light of a first color;
a second LED operable to emit light of a second color; and
a third LED operable to emit light of a third color.

5. The multicolor light source of claim 1, wherein the at least one aspect is a tint.

6. The multicolor light source of claim 1, wherein the at least one aspect is a brightness.

7. The multicolor light source of claim 1, wherein the first and second light sources illuminate a portion of a display device.

8. The multicolor light source of claim 1, wherein at least one of the first and second light sources backlight a portion of a computing input device.

9. A keyboard for an electronic device comprising:
at least one light source package including
a first light source operable to emit a first light of a first color;
a first wave guide optically coupled to the first light source; and
a second wave guide operably connected to the first wave guide and optically coupled to a second light source; and
at least one key optically coupled to the light source package;
wherein
the at least one light source package is configured to illuminate at least a portion of the at least one key or a perimeter thereof; and
the combination of the first wave guide and the second wave guide operably couples the first light to the second light, thereby creating an outputted light having at least one aspect, other than hue, different from the first light and the second light, wherein the operably coupling comprises one of:
scattering the first light and the second light in a predetermined pattern to increase a visually-perceived uniformity of a combined color of the outputted light; or
focusing the first light and the second light in a predetermined pattern to increase a visually-perceived separation of colors of the outputted light.

10. The keyboard of claim 9, wherein the second light source is spatially separated from the at least one light source package.

11. The keyboard of claim 10, wherein the at least one light package comprises at least three light packages and the second light source is in optical communication with the second wave guide of each of the at least three light packages.

12. The keyboard of claim 11, wherein the second light sources increases a brightness of the outputted light as compared to a brightness of the first light source.

13. The keyboard of claim 9, wherein the second light forms a part of the at least one light source package.

14. The keyboard of claim 9, wherein:
the first wave guide includes a first ramp-shaped section; and
the second wave guide includes a second ramp-shaped.

15. The keyboard of claim 14, wherein the first wave guide is located above the second wave guide and the second wave guide is configured to transmit light through the first wave guide.

16. A light package comprising:
a first light source configured to emit a first color light;
a first light guide optically coupled to the first light source;
a second light guide operably connected to the first light guide and optically coupled to a second light source configured to emit a second color of light; wherein
the first light guide and the second light guide combine the first color light and the second color light, creating an emitted light having at least one aspect, other than hue, different from the first light and the second light, wherein the combining comprises one of:
scattering the first light and the second light in a predetermined pattern to increase a visually-perceived uniformity of a combined color of the outputted light; or
focusing the first light and the second light in a predetermined pattern to increase a visually-perceived separation of colors of the outputted light.

17. The light package of claim 16, further comprising the second light source.

18. The light package of claim 16, wherein the second color of light is white and the first color of light is a color other than white.

19. The light package of claim 16, wherein
the first light guide includes a first ramp-shaped section; and
the second light guide includes a second ramp-shaped section.

20. The light package of claim 19, wherein the first light guide is positioned over and substantially adjacent to the second light guide and the second light guide is configured to transmit light through the first light guide.

* * * * *